Aug. 7, 1928.
L. EDELMANN
1,680,138
HIGH PRESSURE GREASE GUN CONNECTION
Filed July 17, 1925    2 Sheets-Sheet 1
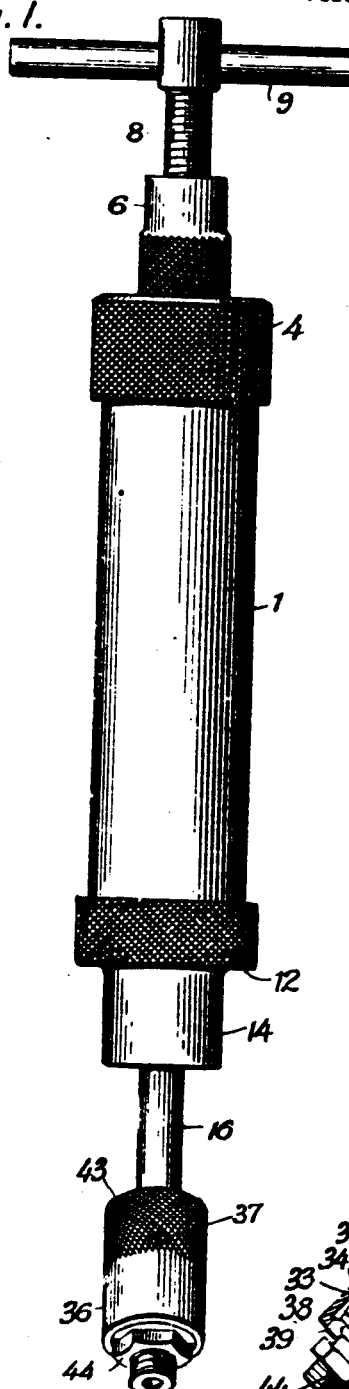
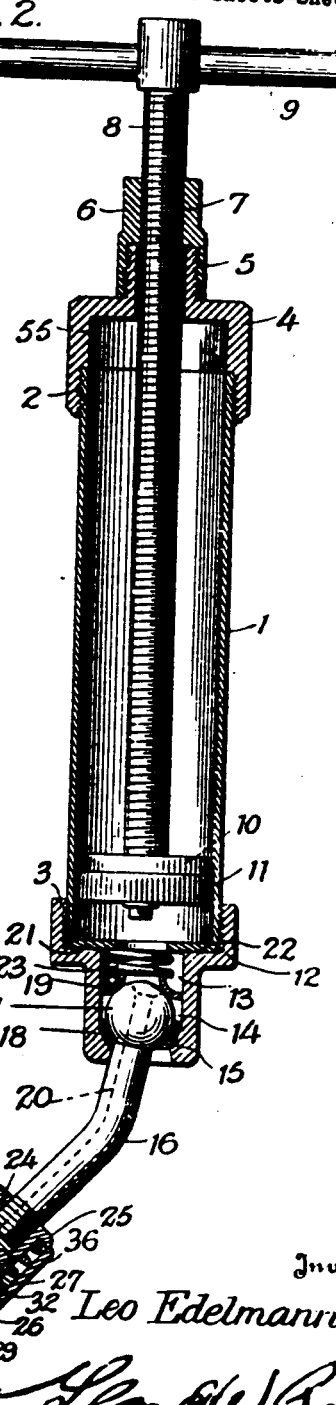
Inventor
Leo Edelmann,
George W. Patch
Attorney Aug. 7, 1928.
L. EDELMANN
1,680,138
HIGH PRESSURE GREASE GUN CONNECTION
Filed July 17, 1925   2 Sheets-Sheet 2
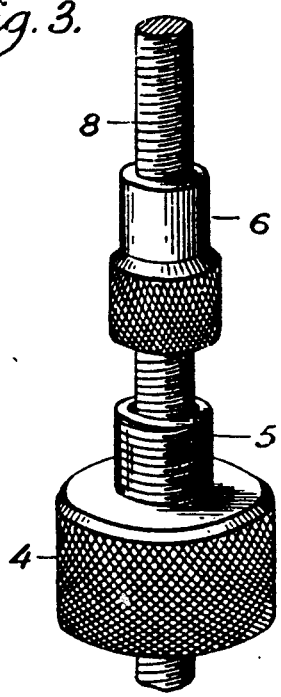
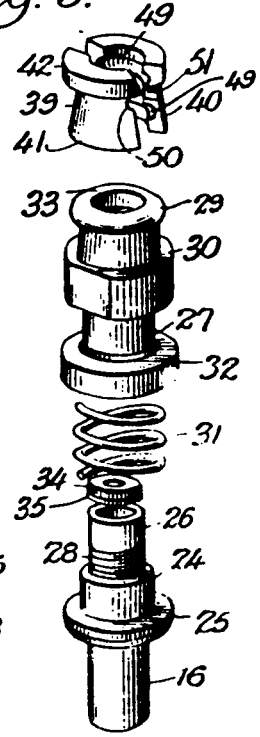
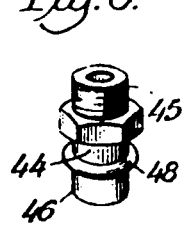
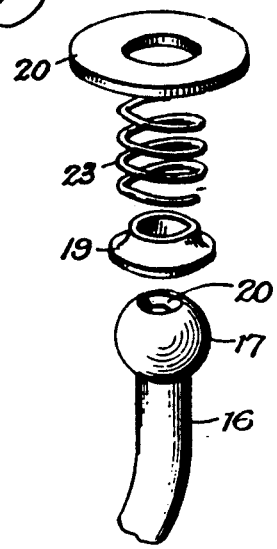
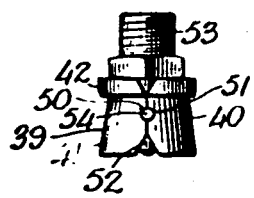
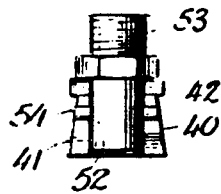
Inventor
Leo Edelmann,
By Lloyd W. Batch
Attorney Patented Aug. 7, 1928.

1,680,138

UNITED STATES PATENT OFFICE.

LEO EDELMANN, OF CHICAGO, ILLINOIS, ASSIGNOR TO E. EDELMANN & CO., OF CHICAGO, ILLINOIS, A CORPORATION OF ILLINOIS.

HIGH-PRESSURE GREASE-GUN CONNECTION.

Application filed July 17, 1925. Serial No. 44,308.

This invention relates to high pressure grease guns, and particularly to a gun adapted for quick attachment to and ready release from grease fittings installed upon the bearings of an automobile or other machine requiring frequent lubrication.

An object of this invention is to provide a grease gun structure with which the attachment to the fittings is accomplished with a minimum of effort and the fittings are firmly gripped and are positively locked in place, irrespective of turning and twisting movement of the gun barrel, until manually released.

A further object is to so construct the grease gun that a swivel connection is provided to facilitate the application to and connection with the fittings located at points upon the machine which are more or less difficult of access.

Another object is to provide a grease gun in which the feed of lubricant is accomplished by a plunger and pressure screw, and to so construct these parts that the return of the plunger can be accomplished quickly and with facility following a pressure grease feeding stroke, and that the plunger can be fitted and fed into the barrel of the gun without difficulty.

Yet another object is to provide a bearing fitting with which my improved grease gun structure can be used.

With the above and other objects in view, which will be apparent to these skilled in the art, this invention includes certain novel features of construction and combinations of parts which will be set forth in connection with the drawings.

In the drawings:

Figure 1 is a view in side elevation of a grease gun constructed in accordance with my invention, and showing a bearing fitting connected with the outlet nozzle thereof.

Fig. 2 is a longitudinal sectional view through the grease gun structure.

Fig. 3 is a fragmentary perspective view to better show the fitting of the pressure screw.

Fig. 4 is a group perspective view of the nozzle assembly.

Fig. 5 is a group perspective view showing the parts of the bearing fitting gripping means.

Fig. 6 is a perspective view showing my improved bearing fitting.

Fig. 7 is a view in side elevation showing the fitting securing chuck as it will be applied in connection with a pin fitting.

Fig. 8 is a view similar to Fig. 7 taken at right angles.

The tubular barrel 1 is screw-threaded at 2 and 3 at its ends, and a cap 4 is fitted on one end and is provided with an outwardly extending externally screw-threaded sleeve 5. A pressure nut 6 is internally threaded to be turned upon the threaded sleeve 5, and is provided with a reduced internally threaded bore 7 beyond the sleeve, and a pressure screw 8 is turned into this threaded bore 7. The pressure screw 8 has a handle 9 at its outer end and its inner end carries a plunger 10, which plunger is provided with a cup washer 11 of leather or other suitable material. This plunger 10 is preferably swivelled on the end of the pressure screw 8, and the pressure screw is of a diameter to turn freely within the opening of the sleeve 5.

A cap 12 is provided to be turned onto the threaded end 3 of the barrel 1, and has a central bore 13 formed therethrough substantially axially in line with the pressure screw 8. This bore is formed through an extension sleeve 14, and at the end of the sleeve the bore is slightly reduced to provide a ball socket 15. An extension nozzle 16 is provided with a ball joint 17 on one end adapted to fit within the ball socket 15, and a packing ring 18 is provided between the ball and socket. A curved ring washer 19 is provided to fit within the bore 13 against the inner side of the ball portion 17, and is open in its center to leave a free opening to the passage 20 through the ball 17 and the extension nozzle 16.

A ring washer 21 is provided to be fitted within the cap 12 and is pressed down by the end of the barrel 1 to engage with a shoulder 22 formed around the bore 13. A coil spring 23 is mounted between this washer 21 and the bearing washer 19, and this spring 23 exerts pressure upon the washer 19 to hold the ball portion 17 in a proper fit against the packing washer 18 in the socket bearing 15. With this arrangement of the parts the bearing ball 17 has a grease tight fit within the socket at all times, and the pressure of grease extruded through the passage 20, upon the inner side of the ball 17, will aid in maintaining this tight fit.

The grease extruding gun as described above is particularly suited for use with high pressure lubricating systems, and I therefore provide a coupling or clutch at the end of the swivelled nozzle 16 by which connection can be made with grease bearing fittings of different types, which clutch or gripping means is perhaps best illustrated in Figs. 2 and 5. The outer end of the nozzle 16 is externally screw-threaded and a coupling member 24 is mounted on this threaded end, this coupling member being provided with a bearing flange 25 around the nozzle and having a sleeve 26 extending from the outer end. The coupling member 24 has an opening therethrough substantially in line with the passage 20 of nozzle 16, and a bearing sleeve 27 is internally threaded to be turned on to the threads 28 of the extension sleeve 26. This bearing sleeve 27 is provided with a bearing bead 29 at its outer extremity and has a flange 30 thereon corresponding substantially to the flange 25 of member 24, the members 24 and 27 being of substantially continuous diameter between the flanges 25 and 30. In assembling these parts a coil spring 31 is fitted over the member 24 and a casing ring 32 is fitted on top of the spring 31. The sleeve member 27 is provided with a shoulder 33 adjacent its outer end and a gasket 34 having a washer 35 fitted thereagainst is pressed against this shoulder 33 by the extension sleeve 26 of the member 24. When the member 26 has been assembled with the member 24 the gasket 34 is securely held in place and the casing ring 32 is slidably mounted between the flanges 25 and 30, this casing ring being resiliently pressed against the flange 30 by the spring 31.

A casing 36, in the form of a tubular sleeve, is to be fitted slidably over the assembled members 24 and 27, after the manner shown in Fig. 2, and a set screw 37 is provided to connect the casing ring 32 with the casing. With this assembly the spring 31 also serves to resiliently maintain the sleeve 36 in the position disclosed in Fig. 2. Sleeve 36 has an inwardly extending flange 38 at its outer end, and the clutch or gripping jaws 39 and 40 are assembled upon the bearing bead 29 to be within this flanged end of the sleeve when the sleeve is in place. These gripping jaws 39 and 40 are tapered as indicated at 41, and at their outer ends are provided with flanges 42 which combine to form a ring flange of substantially the same diameter as the opening within the flange 38. With this construction and assembly, when the sleeve 36 is in the position illustrated in Fig. 2, in which position it is normally resiliently held by spring 31, the flange 38 will engage with flanges 42 on the gripping jaws 39 and 40 to hold the same in fixed positions; but, when the sleeve 36 is pulled inwardly against the pressure of spring 31 the flange 38 is around the tapered portions 41 of the gripping jaws and these jaws will fall apart to enlarge the opening between the same. To facilitate manipulation of the sleeve 36 it is preferable that this sleeve be knurled or otherwise roughened as shown at 43.

In Figs. 2 and 6 I have illustrated a bearing fitting with which my improved grease gun structure can be used, and in this adaptation the fitting 44 is provided with screw threads at 45 at one end to be turned into an opening provided in the bearing which is to be lubricated. The fitting has an outward extension 46 provided with a lubricant passage, and the passage is preferably closed by the usual spring held ball which excludes dirt and dust but is displaced to permit entrance of grease or other lubricant supplied under pressure. A bead 48 is provided around the extension 46, and the jaws 39 and 40 are provided with a groove 49 on their inner sides shaped to take and substantially fit upon this bead 48.

When my improved grease gun structure is to be used upon this fitting the sleeve 36 is grasped and is drawn inwardly to cause flange 38 to clear flange 42 and the gripping jaws 39 and 40 will then fall apart or separate to permit fitting of the parts over the extension end 46 of the bearing fitting 45. The outer end of the extension 46 bears against gasket 34 and the bead 48 registers with the corresponding shaped groove 49. When the sleeve 36 is released the spring 31 again urges the sleeve outwardly to set the flange 38 around flanges 42 and the gripping jaws are thus securely held and locked upon the fitting 45. Gasket 34 will form a proper connection between the passage 20 and the intake end of the bearing fitting. In this mounting of the parts the gripping jaws are positively locked and held upon the bearing fitting and are secured against detachment or displacement until the sleeve 36 is again manually slid back against the pressure of spring 31 to release the jaws, and the nozzle 16 can be freely revolved with respect to the bearing fitting and the gun barrel can be turned and twisted without disturbing the mounting upon the bearing fitting and without damaging or displacing any of the parts.

My improved gripping or connecting means is also readily adapted for use upon bearing fittings having extending pins, and upon other types of fittings. In Figs. 7 and 8 I have illustrated the connection with the pin type of bearing fittings and in this connection the gripping jaws 39 and 40 are notched transversely as at 50 and 51 at their adjacent edges, so that when the sleeve 36, is pulled back and the gripping jaws 39 and 40 are placed over the outer end 52 of a stranded pin fitting 53 these notches 50 and 51 will accommodate the pins 54. As the sleeve 36 is released the spring 31 urges the same outwardly to close gripping jaws 39 and 40 and the pins 54 are securely held in the notches or groves 50 and 51, the gasket 34 bearing against the intake end of the fitting 53.

With the swivel or universal mounting of the nozzle 16, it will be found desirable to load the barrel of my improved grease gun through the outer threaded end at 2, and this requires withdrawal of the pressure screw 8 and plunger 10. In grease guns as now constructed difficulty is experienced in refitting the plunger into the barrel after withdrawal of the same, as the cup washer 11 expands as soon as withdrawn and this cannot be readily replaced within the outer end of the barrel. To overcome this difficulty I make the cap 4 of greater length than is required to embrace the screw threaded portion 2 and reduce the inner bore of the cap to be of substantially the same diameter as the inner diameter of the barrel. With this construction the plunger 10 can be drawn back into the cap to such an extent that the cup washer 11 is entirely within this reduced bore at 55, and in reassembling the parts the cap is turned onto the threaded end 2 and the plunger can then be fed forward into the barrel through the medium of the pressure screw 8 without danger of the cup washer being displaced or damaged. Also, with this construction it is possible to fill the barrel 1 with grease entirely up to its end and the gun can be assembled without the possibility of any of the grease being squeezed out around the barrel by the plunger 10, as the parts are assembled.

By passing the pressure screw 8 loosely through sleeve 5 and providing the pressure nut 6, it is possible to remove the pressure nut and spin the same upon the pressure screw to feed the screw back when the gun is to be reloaded, and thus the tedious operation of turning the screw to accomplish this feed back is avoided.

From the foregoing it will be seen that I have provided a grease gun structure particularly adapted for use with high pressure lubricating systems, that the gun can be easily and readily reloaded with grease at any time, and that a connection can be made with any type of bearing fitting which will positively lock and hold the gun upon the fitting until the connection is manually released, irrespective of turning and twisting movement of the grease gun or parts thereof.

While I have herein shown and described only certain specific constructions and embodiments of my invention, have illustrated connection with only certain specific types of bearing fittings, and have suggested only certain possible modifications and adaptations, it will be appreciated that changes and variations can be made in the form, construction, arrangement and assembly of the parts to adapt the same for the particular conditions of use, without departing from the spirit and scope of my invention.

I claim:

1. In combination with a lubricant receiving bearing fitting having a projection thereon and a lubricant conducting nozzle, a bearing member carried at the outer end of said nozzle having a bearing bead thereon, tapered jaws mounted for rocking movement on the bearing bead to separate to receive the bearing fitting, and a sleeve slidably mounted on the nozzle bearing to be moved to a position to close the jaws upon the bearing fitting and secure the same against rocking to the open position.

2. In combination with a lubricant receiving bearing fitting having a projection thereon and a lubricant conducting nozzle, a bearing member carried at the outer end of said nozzle having a bearing bead thereon, tapered jaws mounted for rocking movement on the bearing bead to separate to receive the bearing fitting, a sleeve slidably mounted on the nozzle bearing to be moved to a position to close the jaws upon the bearing fitting and secure the same against rocking to the open position, said jaws being recessed to fit the projection on the bearing fitting, and a spring normally resiliently urging the sleeve to the position in which the jaws are closed.

3. In combination with a lubricant receiving bearing fitting having a projection thereon and a lubricant conducting nozzle, a bearing member carried at the outer end of said nozzle having a bearing bead thereon, tapered jaws mounted for rocking movement on the bearing bead to separate to receive the bearing fitting, a sleeve slidably mounted on the nozzle bearing to be moved to a position to close the jaws upon the bearing fitting and secure the same against rocking to the open position, said jaws being recessed to fit the projection on the bearing fitting, a spring normally resiliently urging the sleeve to the position in which the jaws are closed, and a packing gasket carried by the nozzle bearing member to engage with the bearing fitting.

In testimony whereof I hereunto affix my signature.

LEO EDELMANN.